United States Patent
Kerfoot, III et al.

Patent Number: 6,122,298
Date of Patent: Sep. 19, 2000

[54] MULTI-WAVELENGTH OPTICAL PUMP

[75] Inventors: Franklin W. Kerfoot, III, Middletown; Howard D. Kidorf, Red Bank; Xiaobing Ma, Eatontown; Karsten Rottwitt, Aberdeen, all of N.J.

[73] Assignee: Tyco Submarine Systems Ltd., Eatontown, N.J.

[21] Appl. No.: 08/742,527

[22] Filed: Nov. 1, 1996

[51] Int. Cl.[7] .................................................. H01S 3/30
[52] U.S. Cl. .................................................. 372/6; 372/69
[58] Field of Search ........................................ 372/6, 69

[56] References Cited

U.S. PATENT DOCUMENTS 5,455,710   10/1995   Takeda ..................................... 372/6
5,695,558   12/1997   Tohmon et al. .......................... 372/70

*Primary Examiner*—Leon Scott, Jr.
*Attorney, Agent, or Firm*—Brian K. Dinicola

[57] ABSTRACT

A high-powered optical pump includes at least two sub-pumps. Each sub-pump generates light at different wavelengths. The outputs of the sub-pumps are coupled to a remote pump fiber. The resulting light transmitted on the remote pump fiber results in a lower Raman gain and Raman noise spectral peak than that generated by existing single wavelength high-powered optical pumps at the same power level. Therefore, increased power can be transmitted on the remote pump fiber in contrast to a single wavelength pump. Additionally, the total gain spectrum available for the amplification of signals is increased.

10 Claims, 2 Drawing Sheets

MULTI-WAVELENGTH OPTICAL PUMP

BACKGROUND OF THE INVENTION

The present invention is directed to an optical pump used with a remote amplifier. More particularly, the present invention is directed to an optical pump that produces light at a plurality of wavelengths.

Optical transmission systems have recently been developed that utilize remote amplifiers to amplify optical signals. FIG. 1 illustrates a section of an exemplary optical transmission system that includes remote amplifiers.

The optical transmission system 5 includes a pair of optical fibers 11, 12 on which optical signals travel in the direction indicated by the arrows. Multiple repeaters are placed along the fibers 11, 12. One such repeater 10 is shown in FIG. 1. The repeater 10 includes a high-powered optical pump 14. Coupled to the high-powered optical pump 14 is a remote pump fiber 15 that extends externally from the repeater 10. The remote pump fiber 15 includes branches 16, 18.

The transmission system 5 further includes multiple remote erbium doped fibers (EDFs) 22, 28 disposed along the fibers 11, 12. Each remote EDF 22, 28 is coupled to a section of the remote pump fiber 15 and to an optical isolator through a wavelength division multiplexer (not shown). For example, erbium doped fiber 22 is disposed on fiber 11 and is coupled to remote pump fiber branch 16 and optical isolator 24. Erbium doped fiber 28 is disposed on fiber 12 and is coupled to remote pump fiber branch 18 and optical isolator 26. The arrangement of remote pump fibers and erbium doped fibers amplifies the optical signals on the fibers 11, 12 in a known way.

In the optical transmission system 5, it is desirable for the optical signal supplied by the pump 14 to the remote pump fiber 15 to have as large amount of power as possible for multiple reasons. First, as the power is increased at the input of the fiber 15, power at the output of the fiber 15 (at remote pump fiber branches 16, 18) where it is coupled to the erbium doped fibers 22, 28 is increased, thus increasing the amount of amplification provided by the erbium doped fibers 22, 28.

Further, as the power is increased, the length of the remote pump fiber 15 can be increased and therefore the distance between the pump 14 and the fibers 22, 28 can be increased.

Finally, as the power is increased, more branches similar to remote pump fiber branches 16, 18 can be coupled to the remote pump fiber 15 and used to pump additional remote erbium doped fibers.

However, optical fibers are limited in how much power they can carry. This limitation is caused by the effects of Raman gain and Raman noise.

In FIG. 2, the curve 32 is typical of the spectral dependence of the Raman gain coefficient for a silica optical fiber pumped at 1480 nm (see Govind P. Agrawal, *Nonlinear Fiber Optics*, Second Edition, Academic Press, 1995, pg. 318). The resultant gain spectrum in a lossless fiber is related exponentially to the gain coefficient by:

$$G(\lambda) = e^{\left[g_r(\lambda) P \frac{L}{A}\right]}$$

where P is the optical pump power and L/A is the effective length divided by the effective cross-sectional area of the fiber and is the property of the particular optical fiber. The curve 32 is centered around 1583 nm and has a spectral peak of approximately $C_4$.

The resultant Raman noise spectrum is similar to the Raman gain spectrum and is centered around 1583 nm, the Stokes-shifted wavelength. However, light at this wavelength is of no use in providing pump power to the remote erbium doped fibers 22, 28 because it is at the wrong wavelength. Therefore, the generated Raman noise is an undesirable byproduct of the remote pump 14 because it reduces the power of the useful light that is supplied to the remote erbium doped fibers 22, 28. Further, the amplitude of both the Raman noise and the Raman gain in the fiber 15 increases exponentially as the amplitude of the input pump 14 is increased.

In addition to being subject to Raman gain, the Raman noise is also reflected inside the fiber 15 through the process of Rayleigh reflection. These reflections cause the generated noise to be subject to more gain that it would otherwise. When the fiber's gain reaches a threshold, the fiber 15 will lase at the peak Stokes-shifted wavelength. This is a limiting condition where an overwhelming amount of pump power is converted to the Stokes-shifted wavelength. Furthermore, the gain spectrum available for the amplification of signals is limited by the extent of the Raman gain spectrum shown in FIG. 2.

Based on the foregoing, there is a need for an improved high-powered pump that enables additional power to be input into the remote pump fiber 15.

SUMMARY OF THE INVENTION

The present invention is a high-powered optical pump that includes at least two sub-pumps. Each sub-pump generates light at different wavelengths. The outputs of the sub-pumps are coupled to a remote pump fiber. The resulting light transmitted on the remote pump fiber results in a lower Raman gain and Raman noise spectral peak than that generated by existing single wavelength high-powered optical pumps at the same power level. Therefore, increased power can be transmitted on the remote pump fiber using the present invention in contrast to a single wavelength pump.

DETAILED DESCRIPTION

Figure 1:
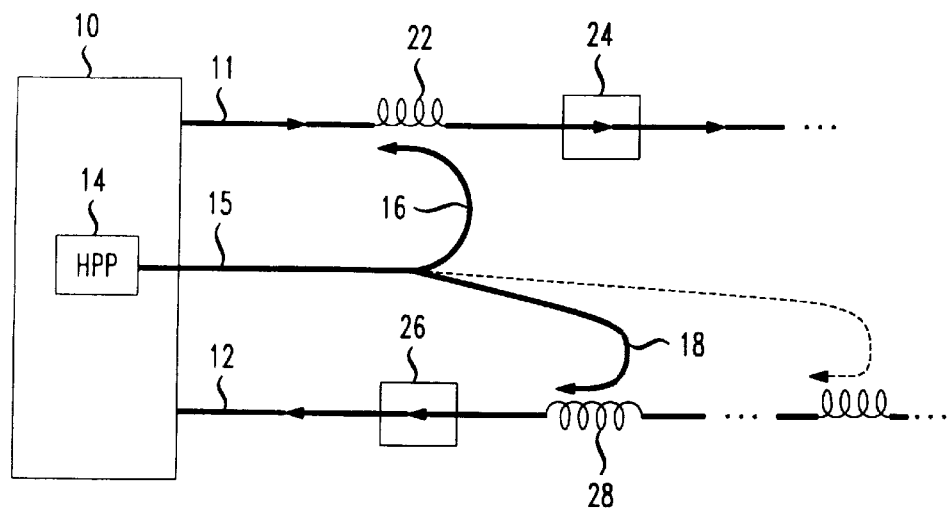
FIG. 1 illustrates a section of an exemplary optical transmission system that includes remote repeaters.
Figure 3:
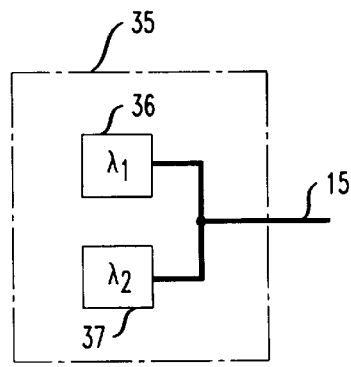
FIG. 3 is a block diagram of the present invention.

FIG. 3 is a block diagram of the present invention which is an improved high-powered optical pump 35 intended to replace the high-powered pump 14 in the optical transmission system 5 shown in FIG. 1. The high-powered pump 35 includes two sub-pumps 36, 37, each generating light at a different wavelength. In one embodiment, sub-pump 36 generates light at 1450 nm and sub-pump 37 generates light at 1500 nm. These wavelengths are chosen for this embodiment because they are separated sufficiently to significantly reduce the peak gain coefficient but are still effective at remotely pumping an erbium doped fiber to achieve optical gain.

In one embodiment, the total output power of the pump 35 is equal to the total output power of the pump 14 in order to provide a comparison of the corresponding Raman noise and Raman gain spectrum for each pump. However, in other embodiments the total output power of the pump 35 is higher than the total output power of the pump 14.

The outputs of the two sub-pumps 36, 37 are coupled together and transmitted on remote pump fiber 15.

The gain spectrum resulting from a two wavelength source such as the optical pump 35 is given by:

$$G(\lambda) = e^{\left[g(\lambda-\lambda_1)P_1\frac{L}{A} + g(\lambda-\lambda_2)P_2\frac{L}{A}\right]}$$

where $G(\lambda)$ is the gain coefficient for the fiber, $g(\lambda-\lambda_1)$ is the spectral gain coefficient due to the first pump, or sub-pump 36, with wavelength $\lambda_1$ and power $P_1$, and $g(\lambda-\lambda_2)$ is the spectral gain coefficient due to the second pump, or sub-pump 37, with wavelength $\lambda_2$ and power $P_2$.

Figure 4:
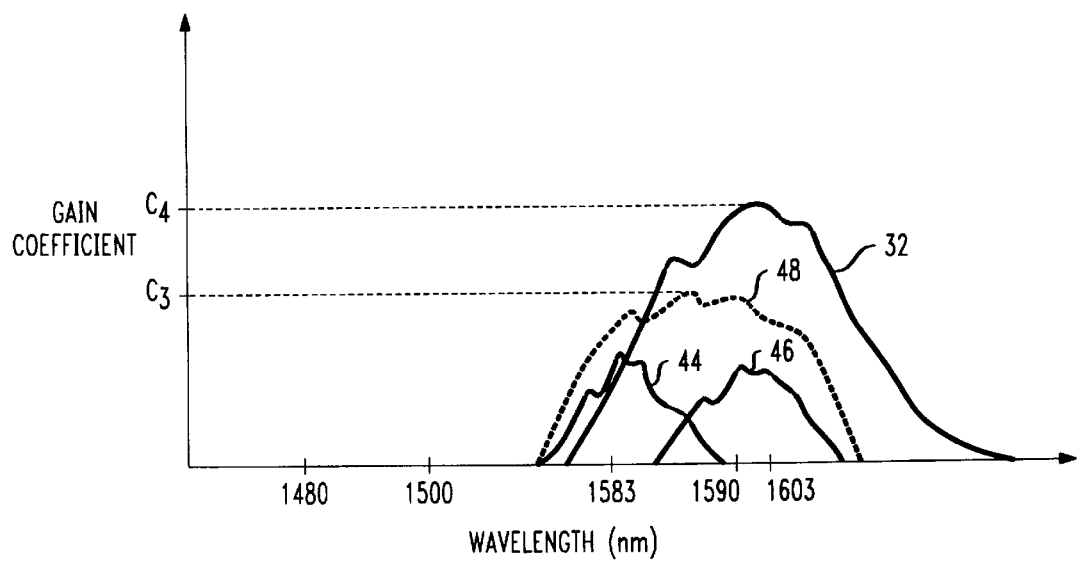
FIG. 4 is a graph of the gain coefficient versus wavelength of a fiber pumped with an optical pump generating two different wavelengths in accordance with the present invention.

FIG. 4 is a graph of the gain coefficient versus wavelength of remote optical fiber 15 pumped with optical pump 35. Curves 44 and 46 are the resulting Raman gain coefficients due to the sub-pumps 36 and 37. Curve 44 is centered around 553 nm. Curve 46 is centered around 1603 nm.

Curve 48 represents the addition of curves 44 and 46 and is the gain coefficient spectrum derived from the above equation. The spectral peak of curve 48 is $C_3$.

Figure 2:
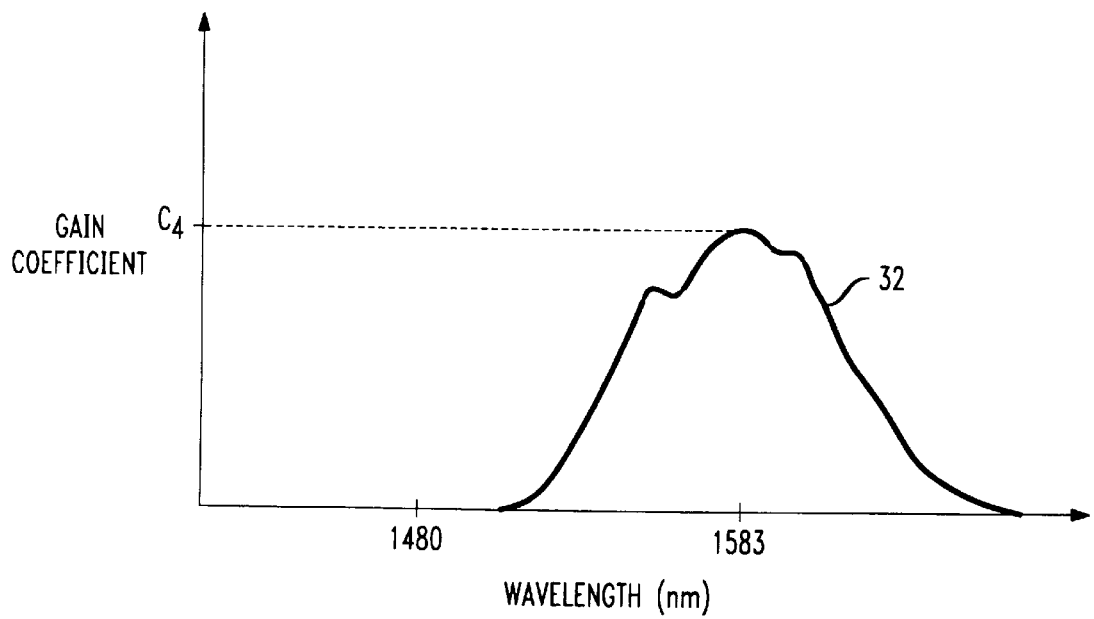
FIG. 2 is a graph of the gain coefficient versus wavelength of a remote pump fiber.

Curve 32 from FIG. 2 is also shown in FIG. 4 for comparison purposes. As shown, using the same input power, the spectral peak of curve 48, $C_3$, is less than the spectral peak of curve 32, $C_4$. Therefore, more power can be input into the remote pump fiber 15 using the high-powered pump 35 relative to the high-powered pump 14 before the fiber 15 is subjected to the negative effects of amplified Raman noise.

As described, the spectral peak of the sum of the spectra caused by pumps at two different wavelengths is less than that than it would be if the pumps were at the same wavelength. Since the peak gain coefficient is less and the gain coefficient is exponentially related to gain, the total gain at the Stokes-shifted wavelengths and hence the total noise is reduced. Since the peak gain is reduced, the propensity to further enhance the Stokes-shifted power through internal reflection is also reduced. An additional benefit that results from the use of two pumps of different wavelengths is that the gain spectrum available for the amplification of signals is increased through the use of two or more pumps at different wavelengths.

What has been described is merely illustrative of the application of the principles of the present invention. Other arrangements and methods can be implemented by those skilled in the art without departing from the spirit and scope of the present invention. Further, the use of the present invention is not limited to using multiple wavelength pumps for the use of providing pumps for erbium doped fibers, but may be applied in all situations where Raman gain limits total power handling capacity of an optical fiber or where it is desirable to use a bandwidth in excess of that provided by the Raman process pumped with a monochromatic pump.

What is claimed is:

1. An optical amplifier comprising:
    a rare earth doped optical fiber producing an amplified optical signal upon optical pumping of said rare earth doped optical fiber at a pumping energy characterized by a pumping wavelength, said pumping wavelength falling within a band of wavelengths effective to supply said pumping energy to said rare earth doped optical fiber;
    a second optical fiber; and
    first and second optical sub-pump sources optically coupled to said rare earth doped fiber by said second optical fiber, said first and second optical sub-pump sources generating first and second optical spectra centered at a first and a second wavelength, respectively, and said sub-pump sources collectively supplying a given amount of power to said rare earth doped optical fiber;
    said first and second wavelengths generated by said sub-pump sources being within said band of effective wavelengths such that each of said first and second optical spectra provides a substantial portion of said pumping energy to said rare-earth doped optical fiber;
    wherein Raman gain collectively generated by propagation of said first and second optical spectra along said second optical fiber is less than that which would have been generated by propagation of a third optical spectrum centered at a single peak wavelength within said band of effective wavelengths for supplying said given amount of
    optical power to said rare earth doped optical fiber.

2. The amplifier of claim 1 wherein said rare-earth doped optical fiber is an erbium-doped fiber and said pumping; wavelength is 1480 nm.

3. The amplifier of claim 2 wherein said first wavelength equals approximately 1450 nm and said second wavelength equals approximately 1500 nm.

4. A method of pumping a rare earth doped optical fiber at a pumping energy characterized by a pumping wavelength falling within a band of wavelengths effective to supply pumping energy to said rare earth doped optical fiber, said method comprising the steps of:
    generating first and second optical spectra centered at a first wavelength and a second wavelength, respectively, said first and second optical spectra collectively supplying a given amount of optical power to said rare earth doped optical fiber; and
    transmitting said first and second optical spectra through a second optical fiber remotely coupled to said rare-earth doped optical fiber;
    said first and second wavelengths generated by said sub-pump sources being within said band of effective wavelengths such that each of said first and second optical spectra provides a substantial portion of said pumping energy to said rare-earth doped optical fiber;
    wherein Raman gain collectively generated by propagation of said first and second optical spectra along said second optical fiber is less than that which would have been generated by propagation of a third optical spectrum centered at a single peak wavelength within said band of effective wavelengths for supplying said given amount of optical power to said rare earth doped optical fiber.

5. The method of claim 4 wherein said rare-earth doped optical fiber is an erbium-doped fiber and said pumping wavelength is 1480 nm.

6. The method of claim 5 wherein said first wavelength equals approximately 1450 nm and said second wavelength equals approximately 1500 nm.

7. An optical transmission system comprising:
    a first optical fiber that carries a plurality of optical signals;
    an optical amplifier positioned along said first optical fiber, said optical amplifier including
        a rare earth doped optical fiber amplifying said optical signals upon optical pumping of said rare earth doped optical fiber at a pumping energy characterized by a pumping wavelength, said pumping wavelength falling within a band of wavelengths effective to supply pumping energy to said rare earth doped optical fiber;

a second optical fiber; and first and second optical sub-pump sources optically coupled to said rare earth doped fiber by said second optical fiber, said first and second optical sub-pump sources generating first and second optical spectra centered at a first and a second wavelength, respectively, and said sub-pump sources collectively generating a given amount of power to said rare earth doped optical fiber;

said first and second wavelengths generated by said sub-pump sources being within said band of effective wavelengths such that each of said first and second optical spectra provides a substantial portion of said pumping energy to said rare-earth doped optical fiber;

wherein Raman gain collectively generated by propagation of said first and second optical spectra along said second optical fiber is less than that which would have been generated by propagation of a third optical spectrum centered at a single peak wavelength within said band of effective wavelengths for supplying said given amount of optical power to said rare earth doped optical fiber.

8. The system of claim 7 wherein said rare-earth doped optical fiber is an erbium-doped fiber and said pumping, wavelength is 1480 nm.

9. The system of claim 8 wherein said first wavelength equals approximately 1450 nm and said second wavelength equals approximately 1500 nm.

10. A method of amplifying an optical signal, comprising the steps of:

generating first and second optical spectra centered at a first wavelength and a second wavelength, respectively; and supplying said first and second optical spectra to a rare-earth doped optical fiber, said first and second wavelengths being within a band of effective wavelengths effective to supply pumping energy to said rare earth doped optical fiber such that each of said first and second optical spectra delivers a substantial portion of said pumping energy to said rare-earth doped optical fiber;

wherein Raman gain collectively generated by propagation of said first and second optical spectra is less than that which would have been generated by propagation of a third optical spectrum centered at a single peak wavelength within said band of effective wavelengths and supplying said given amount of optical power to said rare earth doped optical fiber.

* * * * *